United States Patent [19]

Ranger

[11] Patent Number: 4,647,332

[45] Date of Patent: Mar. 3, 1987

[54] METHOD AND APPARATUS FOR LAMINATING FOIL TO A SUBSTRATE

[75] Inventor: Alan E. Ranger, Maidstone, England

[73] Assignee: Internationale Octrooi Maatschappij "Octropa" B.V., Rotterdam, Netherlands

[21] Appl. No.: 571,275

[22] Filed: Jan. 16, 1984

[30] Foreign Application Priority Data

Jan. 17, 1983 [GB] United Kingdom ............... 8301190

[51] Int. Cl.⁴ .......................................... B32B 31/24
[52] U.S. Cl. .................................. 156/285; 156/324; 156/326; 156/338; 156/382; 156/555; 156/583.5
[58] Field of Search ............... 156/285, 324, 326, 338, 156/382, 583.3, 583.5, 555

[56] References Cited

U.S. PATENT DOCUMENTS

| | | |
|---|---|---|
| 2,934,467 | 4/1960 | Bergstein . |
| 3,814,653 | 6/1974 | Heier .................................... 156/285 |
| 4,131,581 | 12/1978 | Coker ............................... 524/249 X |
| 4,264,400 | 4/1981 | Breitmar ......................... 156/285 X |

Primary Examiner—Robert A. Dawson
Attorney, Agent, or Firm—Cushman, Darby & Cushman

[57] ABSTRACT

A thin foil or film is laminated to a substrate with an adhesive layer therebetween thicker than the surface roughness of the substrate, the laminating and drying of the adhesive being effected with the foil contacting a smooth contact surface under a contact pressure, the rate of heat input to dry the adhesive and the pressure on the back of the substrate being controlled to maintain the vapor pressure at the interface between the film and the adhesive above atmospheric and below the contact pressure so that the foil surface of the finished laminate is as smooth as the contact surface.

9 Claims, 1 Drawing Figure

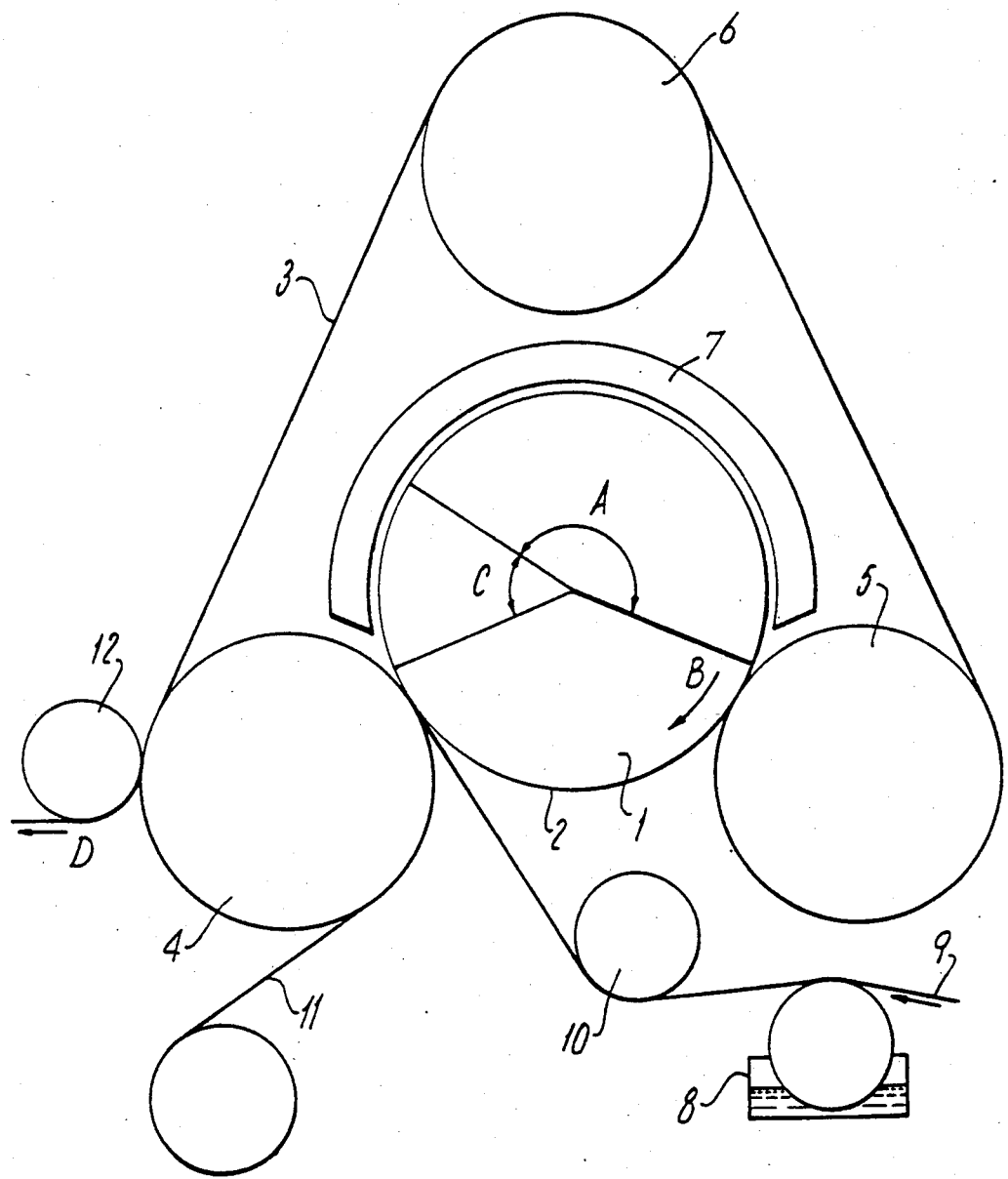

METHOD AND APPARATUS FOR LAMINATING FOIL TO A SUBSTRATE

This invention relates to a method and apparatus for laminating a foil or film to a substrate.

It is often desired to improve the appearance of a permeable substrate such as paperboard by imparting to the substrate a high degree of smoothness and gloss and desired colour. This can be achieved by laminating to the substrate e.g. a metallic foil, a metallised or unmetallised plastics or other smooth and glossy film such as regenerated cellulose film or by transfer matallisation. Such foil or films are generally so thin that on laminating they closely follow the contour of the substrate. With the high degree of surface reflectivity of such foils the surface contour irregularities tend to be more noticeable to the eye and become objectionable. Thin foil or films are therefore sometimes laminated to cast coated substrates having highly smooth surfaces but the cost of cast coated board together with the laminating cost precludes the more general use of such laminated board.

According to the present invention there is provided a method of laminating a film or foil to a permeable substrate comprising applying to the face side of the substrate to be laminated, an adhesive in a carrier liquid at an average dry thickness greater than the surface roughness of the substrate, contacting the adhesive with a film or foil and bringing the film into contact with a smooth contact surface under a contact pressure above atmospheric pressure, heating the adhesive to vaporise the carrier liquid and dry the adhesive with the film in contact with the contact surface, the rate of heat input and the pressure on the back of the substrate being controlled to maintain the vapour pressure at the interface between the film and the adhesive at a level above atmospheric and below the contact pressure.

Because the vapour pressure at the interface between the film and the adhesive is above atmospheric a good contact is assured between the film and the contact surface so that the surface of the film in contact with the contact surface has a surface as smooth as the contact surface. At the same time the vapour pressure between the film and the adhesive is kept below the pressure between the contact surface and the film to prevent the adhesive coating being disrupted internally.

The film or foil after laminating has a surface appearance corresponding to the surface of the contact surface and any irregularities in the contour of the surface of the substrate are taken up by the adhesive. Thus extremely thin foils can be laminated to substrates having surface irregularities without those irregularities being visible in the finished laminate.

The vapour pressure at the interface between the film and the adhesive is dependent upon the machine speed, the rate of heat input and the pressure on the back of the substrate. The rate of heat input can be such that before the adhesive becomes immobile and sets the vapour pressure at said interface would rise above the contact pressure unless the pressure at the back of the substrate is reduced below atmospheric pressure. Where this is not practical, e.g. when the solids content of the adhesive is high enough to prevent sufficient vapour being generated during initial heating of the adhesive before it becomes immobile, the pressure at the interface can be augmented by applying a positive pressure at the back of the substrate to maintain the interface pressure between the aforesaid limits. As the heat input generates more vapour the interface vapour pressure is reduced by applying a reduced pressure at the back of the substrate. By applying a reduced pressure at the back of the substrate the rate of heat input and hence the speed of drying can be increased.

A suitable adhesive is a mixture of calcium carbonate or clay and a synthetic latex (e.g. styrene butadiene or polyvinyl acetate) which can be applied to the board as an aqueous dispersion. The mixture is relatively cheap and can be applied in sufficient quantities to provide a generous filling of the valleys and irregular contours of the substrate.

The contact surface can conveniently be flexible, the laminate being sandwiched between the flexible contact surface and a rigid permeable surface through which the pressure on the back of the substrate can be controlled during heating to dry the adhesive.

Because the process of the present invention can be used with extremely thin foils it is well suited to the laminating of metallic foils or metallised films. It is often desired to laminate such foil or film to a paperboard substrate and a suitable paperboard conventionally has a surface roughness of between about 1 and 3.5 microns as measured by the Parker Printsurf. In the process of the present invention such thin foils can be applied to a paperboard having a surface roughness of up to 8 microns or even more provided the adhesive is applied at an average dry weight thickness sufficient to fill the irregularities in the board surface. For example an average dry adhesive thickness of at least 5 microns should preferably be used with a board of 3 microns surface roughness.

The invention also provides apparatus for laminating a film to a substrate comprising means for applying an adhesive in a carrier liquid to one side of the substrate, feed means for feeding the film into contact with the adhesive, a drying roll having an outer surface permeable to vaporised carrier liquid, a contact surface formed by an endless flexible belt tensioned into contact with a portion of the permeable surface of the drying roll and means for guiding the laminate of the substrate and film between the flexible belt and the permeable surface with the film in contact with the contact surface, and heating means for heating the belt to dry the adhesive whilst the substrate is in contact with the drying roll, at least a part of the permeable surface of the drying roll contacted by the substrate being adapted to be connected to a source of vacuum. Preferably a part of the permeable surface of the drying roll contacted by the substrate is adapted to be connected to a source of pressure above atmospheric pressure.

The invention will now be more particularly described with reference to the accompanying diagrammatic drawing of an embodiment of a laminating apparatus according to the invention.

Referring to the drawing the apparatus comprises a drying roll 1 having an inflexible outer surface 2 which is permeable to vaporised carrier fluid. The drying roll is constructed so that the portion of its outer surface lying in the arc A is connected to a source of vacuum (not shown) whilst the roll rotates in direction of arrow B, and the portion of its outer surface in the arc C is connected to a source of pressure (not shown) above atmospheric pressure.

A continuous flexible contact belt 3 passes around three guide rolls 4, 5 and 6 and is tensioned to intimately contact a portion of the permeable surface of the drying roll with that surface of the belt nearest the drying roll having a surface finish equivalent to that desired on the surface of the finished product. The belt contacts the drying roll with a contact pressure proportional to the tension in the belt. An arcuate array of radiant heaters 7 surrounds a part of the periphery of the roll contacted by the contact belt.

An applicator 8 applies an adhesive in a carrier liquid to one side of a continuous web of a substrate formed by board material 9, the web then passing around a roll 10 and into contact with the drying roll at the nip of the drying roll with the guide roll 4. Also fed to the nip of the drying roll and the guide roll 4 is the film 11. The adhesive coated side of the web comes into contact with the film at the nip. The adhesive is applied at a rate such that the average thickness of the adhesive when dry is greater than the surface roughness of the board.

As the heat from the heaters passes through the belt and heats the adhesive coating a vapour pressure drop occurs across the thickness of the board the magnitude of which depends on the rate of heat input and the permeability of the board. The pressure applied to the permeable surface of the drying roll, whether it be a positive pressure or partial vacuum, determines the pressure at the back of the board and hence the vapour pressure at the interface between the film and the adhesive which should be slightly above atmospheric so that the film is maintained in close contact with the contact surface and below the pressure between the contact surface and the film, i.e. the pressure exerted on the laminate by the tension in the flexible belt. Thus the film is maintained in intimate contact with the belt and the vapour pressure in the board is prevented from being high enough to disrupt the adhesive layer.

The laminate material passes around the rotating suction roll sandwiched between the permeable surface of the roll and the contact surface during which time the adhesive coating is at least partially dried and preferably the majority of the carrier liquid removed. The laminate then remains in contact with the contact surface as the belt passes around rollers 5 and 6 until the laminate is separated from the belt at the take-off roller 12. Any carrier liquid remaining in the adhesive coating after the laminate leaves the suction roll is removed before the laminate, which leaves in direction of arrow D, is wound into a reel or cut into sheets.

The smoothness of the foil surface of the laminate is substantially that of the contact surface of the flexible belt. The maximum surface roughness of a board suitable for such foil laminating can be up to about 8 micron as measured by the Parker Printsurf instrument. Whatever the surface roughness of the board the surface smoothness obtained on the finished product in the present invention is superior to that obtained by conventional laminating. Furthermore the present invention enables board to be used which has a surface roughness greater than 3.5 micron, and hence not suitable for conventional laminating, the finished board according to the present invention having a superior smoothness to that of a board of 3.5 micron or less when conventionally laminated.

In the above described embodiment a positive pressure is applied to the permeable surface of the drying roll over the arc C. This is necessary in order to control the interface vapour pressure between atmospheric and the contact pressure when the operating conditions, e.g. the machine speed, rate of heat input and solids content of the adhesive, are such that the vapour generated at the beginning of the drying is insufficient to bring the interface vapour pressure within the desired range without applying such a positive pressure. Unless the interface vapour pressure is so controlled the film will not intimately contact the flexible belt whilst the adhesive is drying to the point of immobility. Once the adhesive has become immobile the surface of the finished product could not be brought to conform to the smooth surface of the belt.

When the vapour generated at the interface is sufficient, the pressure on the back of the substrate is reduced below atmospheric pressure, i.e. over the arc A, to permit a vapour pressure drop through the thickness of the board greater than the difference between the contact pressure and atmospheric pressure whilst still maintaining the maximum vapour pressure at the interface between the film and the adhesive within the aforesaid limits. Thus a high rate of heat input and hence rapid drying can be achieved without disrupting the adhesive layer.

If the operating conditions are such that the interface vapour pressure created by the heating before the adhesive becomes immobile and sets is greater than the contact pressure the angle C can be reduced or eliminated altogether.

What is claimed is:

1. A method of laminating a film or foil to a permeable substrate comprising applying to the face side of the substrate an adhesive in a vaporisable carrier liquid, the adhesive being applied at an average dry thickness greater than the surface roughness of the substrate, applying the film or foil over the adhesive and bringing the film or foil into laminating contact with a smooth contact surface under a contact pressure above atmospheric pressure, heating the adhesive to vaporise the carrier liquid and dry the adhesive while the film or foil is in contact with the contact surface and removing the vaporised carrier liquid through the back of the substrate, the rate of heat input and the pressure on the back of the substrate being controlled to maintain the vapour pressure at the interface between the film or foil and the adhesive at a level above atmospheric and below the contact pressure, and terminating contact between the film or foil and the contact surface after the carrier liquid has been vaporised and removed whereby the outer surface of the film or foil corresponds to the contact surface and any irregularities in the surface of the substrate are taken up by the adhesive.

2. A method according to claim 1 in which the pressure on the back of the substrate is above atmospheric pressure during initial heating of the adhesive.

3. A method according to claim 1 in which the adhesive is an aqueous dispersion of calcium carbonate and synthetic latex.

4. A method according to claim 1 in which the foil is a metallic foil.

5. A method according to claim 1 the film is a metallised plastics film.

6. A method according to claim 1 in which the substrate is a paperboard having a surface roughness of between 3.5 and 8.0 microns.

7. A method according to claim 1 in which the contact surface is flexible, the laminate being sandwiched between the flexible contact surface and a rigid permeable surface through which the pressure on the back of the substrate can be controlled during heating to dry the adhesive.

8. Apparatus for laminating a film to a substrate comprising means for applying an adhesive coating in a carrier liquid to one side of the substrate and feed means for feeding the film into contact with the adhesive wherein there is provided a drying roll having an outer surface permeable to vaporised carrier liquid, a contact surface formed by an endless flexible belt tensioned into contact with a portion of the permeable surface of the drying roll means for guiding the laminate of the substrate and film between the flexible belt and the permeable surface, and heating means adapted to dry the adhesive whilst the substrate is in contact with the drying roll at least a part of the permeable surface of the drying roll contacted by the substrate being adapted to be connected to a source of vacuum.

9. Apparatus according to claim 8 in which part of the permeable surface contacted by the substrate is adapted to be connected to a source of pressure above atmospheric pressure.

* * * * *